June 5, 1928.
W. T. McFARLAND
MUSHROOM VENT
Filed Dec. 13, 1926
1,672,496
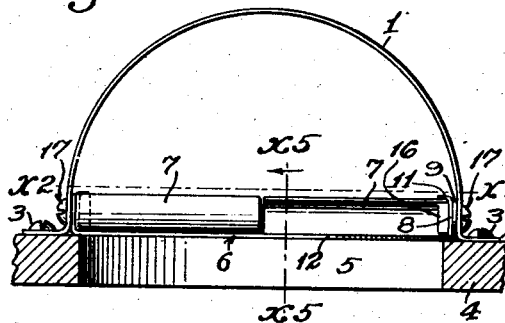
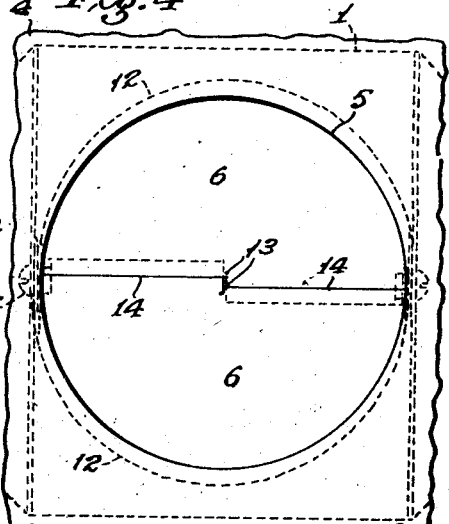
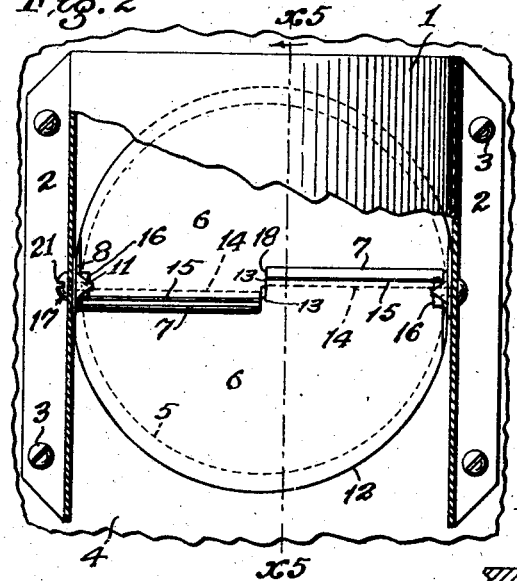
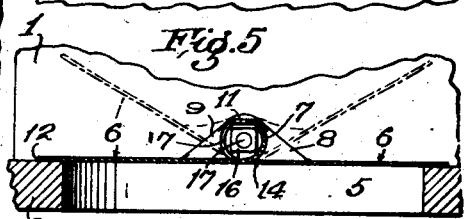
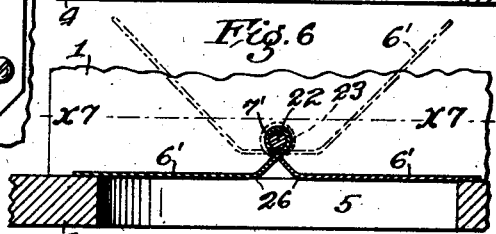
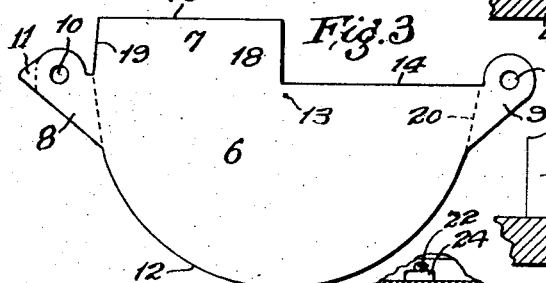
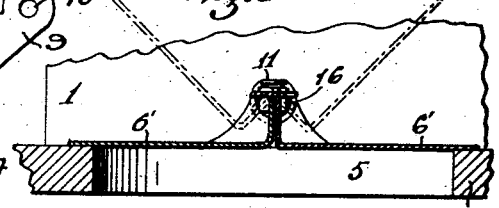
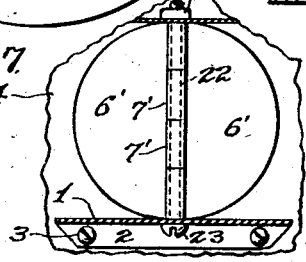
Witness
C. C. Holly
Inventor
William T. McFarland
by
James R. Townsend
his atty.

Patented June 5, 1928.

1,672,496

UNITED STATES PATENT OFFICE.

WILLIAM T. McFARLAND, OF GLENDALE, CALIFORNIA.

MUSHROOM VENT.

Application filed December 13, 1926. Serial No. 154,469.

This invention relates to ventilators adapted to be mounted on the floor underneath seats in theaters, opera houses and other public assembly halls having fixed seats; and it may be employed in other situations, and adapted to various modifications without avoiding the principles of the invention.

It is desirable in vents of this kind that the ventilating air passing up through the valve, shall be directed along the row of seats and not forwardly or rearwardly; so that the air will be diffused without causing any unpleasant or dangerous drafts; and the invention comprises a semi-cylindrical shell open at both ends and having its edges adapted to be fastened to the floor; and two valves adapted to close the ventilating opening in the floor and to be fixed in angular adjustment relative to each other and to the floor, so as to cause the air to flow in opposite directions from the ventilating opening and toward the open ends of the shell, in a predetermined manner.

This invention further provides that the joint between the valve leaves is pivotally connected to the shell; and in preferred construction I show such connection as being effected by two short stove bolts inserted through the shell and through ears formed on the valve leaves and having a head outside the shell and a nut into which the body of the bolt inside the shell is screwed, bearing against one of the ears to clamp the other ear to the shell, or to leave it free, or friction tight, at the will of the attendant; and to accommodate the convenience of the attendant in adjusting and setting the valves.

Objects of this invention are cheapness, durability, simplicity of construction and ease of adjustment.

The invention may be embodied in various constructions and is not limited as to size of its embodiment.

The hood may be semi-cylindrical, or angular in form, the valve bodies conforming thereto so that as they are opened away from the ventilating opening which they close when down, they will not be interfered with by the walls of the hood; and when fully raised they will form a partition between the openings of the hood on opposite sides of the valve leaves.

Other features, objects and advantages of the invention may appear from the accompanying drawing, the subjoined detailed description and the appended claims.

The accompanying drawing illustrates the invention.

Figure 1 is an end elevation of the invention installed with both leaves closed; the floor is sectioned midway of the ventilating aperture.

Fig. 2 is a plan view, the greater portion of the hood being broken away at section line $x^2$, Fig. 1.

Fig. 3 is a view of one of the blanks from which the leaves of the valve shown in Figs. 1-5 are bent up.

Fig. 4 is a view looking from the underside.

Fig. 5 is a section on line $x^5$, Figs. 1 and 2; dot and dash lines indicate an open ventilating position of the valve.

Fig. 6 is a view analogous to Fig. 5, of a modified form.

Fig. 7 is a reduced plan in section on line $x^7$, Fig. 6, of a modified form of the invention.

Fig. 8 shows another modification.

Fig. 9 is a detail showing the two leaves in Fig. 8 separated and in position to be united by pushing them together.

The hood 1 is formed of any suitable sheet material, preferably sheet metal and is shown in the drawings as of semi-cylindrical form open at the ends and having lateral flanges 2 at its edges to be secured as by screws at 3, upon the floor 4 in position with the ends of the hood projecting a required distance at each side of the ventilating opening 5 in the floor.

The stamping shown in Fig. 3 and the valve leaf formed therefrom, comprises a segmental main body 6 slightly greater than a semi-circle and a loop forming projection 7; and said main body is provided with ears 8, 9 having holes 10; one of said ears being provided with an extension 11.

The leaves are pivoted to the hood inside the hood and the hood forms an open ended chamber in which said leaves may be adjusted to different angles to variously deliver and diffuse the air passing through the ventilating hole.

In each of the forms shown in the drawing, assuming the hood to be formed with a space of six and one quarter inches between the inner sides of the walls of the hood, the edge 12 of the main body is an arc drawn to the center 13 with a radius of three and three thirty-seconds inches, and the holes 10 through the ears are located in position to be alined with each other a quarter of an inch beyond the center 13 so as to allow the outer edge 12 to lap over a ventilating hole 5 of a diameter of six inches.

The ears 8 and 9 are bent up at an angle of 90° to the surface of the leaf body 6 and at an angle of about 85° more or less to the straight edges 14 and 15 of the leaf, which are in parallelism with each other.

The arrangement is such that when the ears are bent up, the axis formed by a bolt or pin through the holes 10 in the ears will be in a vertical plane to the inner straight edge 14 of the leaf.

The ear extension 11 is bent inwardly above said axis so that when the two leaves are assembled as in Figs. 1-5, with their loop extensions interlocked, the extensions will form stops to hold stationary the nuts 16 of the bolts 17, which form the axis of the hinge uniting the two valve leaves, so that the bolt may be turned to clamp the ears to each other and the hood.

The inner border 18 of the extension 7 is at right angles to the inner edge 14, the outer edge 19 of the extension 7 is at an angle of about 85° more or less to the border of said extension 7 and the bending line 20 of the opposite ear 9 is of a corresponding angle to the inner edge 14 of the body so that when the extensions 7 are bent up into semi-cylindrical shape with the holes 10 in alignment with each other, the extension 7 of one leaf will cooperate with the edge 14 of the other leaf to form a tight joint in any position of the leaves.

Said angle of about 85° also serves to maintain the lateral edges of the leaves free from friction with the hood throughout the various adjustments of the leaves.

The projections 11 of the ears are bent over inwardly to form stops to prevent the angular sided nuts 16 from turning when the bolts are adjusted by any suitable means as a screw driver, not shown, in engagement with the slotted head 21 of the bolt.

In practical use when one of the bolts is tightened, the leaves are held with a friction depending upon the tightness of the bolt and when the attendant wishes to adjust the valve he will simply loosen such bolt and adjust the valve to the position desired to direct the incoming air toward both or either end of the hood according to the requirements.

In the form shown in Figs. 6 and 7, the bolt 22 extends clear across the hood; its head 23 being at one end and a nut 24 at the other end; both being accessible to the outside; and in this form each leaf 6' is provided with a plurality of loops 7' and are bent to enclose the bolt 22; and the body is appropriately bent at a distance from the loop as indicated at 26 in Fig. 6.

I claim:

1. The combination with a hood; of leaves provided with interlocking loops and with ears having holes therein and retainers; nuts adapted to be held from turning by said retainers; and bolts inserted through the hood and screwed into the nuts.

2. The ventilator described comprising a hood open at both ends and bottom; segmental leaves provided with interlocking loops, and ears having extensions thereon; bolts adapted for insertion through said hood and ears for holding said leaves in said hood; nuts on said bolts and said extensions adapted for engagement with said nuts to frictionally hold the loops in angular relation to the hood.

3. The ventilator described comprising a hood open at both ends and bottom; leaves inside the hood having interlocking loops; ears on said leaves having openings therein; bolts passing through said hood and ears for pivotally securing said leaves in said hood; extensions on said ears; nuts on said bolts and the said extensions adapted to be folded around said nuts for frictionally holding the leaves in position and the loops in angular relation with the hood.

In testimony whereof, I have hereunto set my hand at Los Angeles, California, this 21st day of December, 1925.

WILLIAM T. McFARLAND.